United States Patent [19]
Bartlett

[11] Patent Number: 5,443,131
[45] Date of Patent: Aug. 22, 1995

[54] TRAILER BRAKE SYSTEM

[76] Inventor: Ronald D. Bartlett, Rte. 3, Box 51, Spencer, W. Va. 25276

[21] Appl. No.: 286,419

[22] Filed: Aug. 5, 1994

[51] Int. Cl.⁶ ............................................. B60T 7/20
[52] U.S. Cl. ................................ 188/3 R; 188/2 D; 188/196 V; 280/656; 280/789
[58] Field of Search ............... 188/3 R, 79.55, 79.57, 188/2 D, 22, 202, 196 V; 303/9.61, 7; 280/638, 656, 789; 74/501.5 R, 502.4

[56] References Cited

U.S. PATENT DOCUMENTS

| | | | |
|---|---|---|---|
| 1,341,617 | 5/1920 | Kelley | 188/3 R |
| 2,093,185 | 9/1937 | Bieber | 188/3 R |
| 2,887,183 | 5/1959 | Ross | 188/3 R |
| 3,759,545 | 9/1973 | McKethan | 188/3 R X |
| 5,386,887 | 2/1995 | Hilgert et al. | 188/2 D |

FOREIGN PATENT DOCUMENTS

| | | | |
|---|---|---|---|
| 492923 | 7/1919 | France | 188/3 R |
| 528900 | 11/1921 | France | 188/3 R |
| 268896 | 5/1927 | Italy | 188/3 R |
| 5139269 | 6/1993 | Japan | 188/2 D |
| 2041120 | 9/1980 | United Kingdom | 188/2 D |
| 2165326 | 4/1986 | United Kingdom | 188/2 D |
| 2214257 | 8/1989 | United Kingdom | 188/2 D |

*Primary Examiner*—Robert J. Oberleitner
*Assistant Examiner*—Peter M. Poon

[57] ABSTRACT

A trailer brake system including a releasably latching hand lever, a series of cables interconnecting the lever and mechanically energized brakes capable of locking an opposing road wheel pair. The trailer brake system attaches to an existing travel or boat trailer and is employed to enable a user to secure a trailer when parked thereby preventing inadvertent movement between uses.

1 Claim, 4 Drawing Sheets

TRAILER BRAKE SYSTEM

BACKGROUND OF THE INVENTION

1. Field of the Invention

The present invention relates to trailer brake systems and more particularly pertains to a trailer brake system which may be employed to secure a parked trailer from undergoing inadvertent movement.

2. Description of the Prior Art

The use of trailer brake systems is known in the prior art. More specifically, trailer brake system heretofore devised and utilized for precluding inadvertent movement of parked trailers are known to consist basically of familiar, expected and obvious structural configurations, notwithstanding the myriad of designs encompassed by the crowded prior art which have been developed for the fulfillment of countless objectives and requirements.

The present invention is directed to improving devices for an trailer brake system in a manner which is safe, secure, economical and aesthetically pleasing.

For example, U.S. Pat. No. 3,666,060 to Schroter discloses a service and parking brake arrangement for trailer vehicles comprising a mechanically linked braking system which employs a series of rod linkages, levers, and cables to effect activation of a drum type brake. The Schroter invention provided for service application of braking force by differential reduction of the distance between the trailer and towing vehicle wherein a rodlike member, a lever, and a cable transmit braking force to brake shoes engaging a brake drum within a roadwheel assembly. Adjunctively disposed with the device brake of the Schroter invention is a ratchet actuated manual brake which may be employed to lock the trailer road wheels for parking. The Schroter invention is not devised to be used with trailers not requiring an integrally disposed service braking system. The present invention is applicable for use as a parking brake for trailers not requiring a service brake and furthermore does not require a mechanical trailer tow vehicle interface in difference to a conventional trailer engagement tongue. The present invention additionally may be employed in cooperation with trailers having certain types of braking systems including hydraulic and mechanical systems wherein braking causative action is transmitted to the trailer through the trailer engaging tongue.

In U.S. Pat. No. 5,127,495 to Verner et al. a parking brake and method therefor is disclosed comprising a drum brake actuated in a service mode by an electrically pressurized hydraulic system and actuated in a parking mode by an electrical actuated solenoid. The Verner et al. invention has no provision for a simple mechanically actuated and maintained parking brake. The present invention comprises a simplistic directly coupled mechanically linked parking brake and requires no electrical power or pressurized hydraulic or pneumatic provisions.

In U.S. Pat. No. 4,722,575 to Graham a mechanical emergency and parking brake system is described. The Graham invention comprises an hydraulically powered mechanical braking system which establishes braking action upon relief of hydraulic pressure supplied by a pump source. There is no provision for non-fluid transmission of braking power in the Graham invention. The present invention comprises a latching lever and cable braking power transmission system and is thereby not susceptible to leaks and sticking valve components.

In U.S. Pat. No. 4,667,785 to Toyoda et al. a parking brake arrangement for vehicles is disclosed for attachment to a vehicle such as a three or four wheel buggy wherein a locking lever is attached to a clutch lever thereby maintaining engagement of said clutch which therein provides continued braking action upon a wheel or other moving part of the vehicle. A disadvantage in this prior art lies in a lack of immediate adjustability and general mechanical advantage required to maintain braking of a large travel or boat trailer. The present invention comprises a strong lever producing significant mechanical advantage capable of maintaining braking of the larger travel and boat trailers, and furthermore incorporates a ratchetlike latching device which provides an adapting adjustment capability wherein the degree of brake engagement may be instantly varied to accommodate various trailer sizes and rolling susceptibilities under non-level parking conditions.

U.S. Pat. No. 3,850,266 to Hesskamp et al. discloses a parking brake. The disclosure teaches a disc brake rotor having an extending drum portion, a disc brake caliper, and a brake shoe pair wherein the disc brake portions are employed for service braking and the shoe brake portions are employed for emergency and parking functions. The disclosure makes no provision for simple actuation of a shoe brake by a manual latching lever and cable interconnection. Furthermore, the combined hydraulic and mechanical systems required in support of the Hesskamp et al. invention are excessive for application to low cost, lighter weight travel and boat trailers. The present invention comprises a latching lever operated, cable interconnected inexpensive braking system which is suitable for application in travel and boat trailers.

In this respect, the trailer brake system according to the present invention substantially departs from the conventional concepts and designs of the prior art, and in so doing provides an apparatus primarily developed for the purpose of maintaining braking of a trailer throughout parking conditions.

Therefore, it can be appreciated that there exists a continuing need for new and improved trailer brake system which can be employed to maintain brake engagement of a trailer when parked or during tow vehicle engagement/disengagement. In this regard, the present invention substantially fulfills this need.

As illustrated by the background art, efforts are continuously being made in an attempt to improve parking brake systems. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of vehicular parking brake systems now present in the prior art, the present invention provides an improved trailer brake system construction wherein the same can be utilized for releasably maintaining braking conditions for a parked trailer. As such, the general purpose of the present invention, which will be described subsequently in greater detail, is to provide a new and improved trailer brake system apparatus and method which has all the advantages of the prior art vehicular parking brake systems and none of the disadvantages.

The invention is defined by the appended claims with the specific embodiment shown in the attached drawings. For the purpose of summarizing the invention, the invention may be incorporated into an elongated lever pivotably attached to a bracket member or a frame portion of a trailer and having a ratcheting disengagable latch which permits releasable maintenance of the lever in a plurality of angular dispositions about the pivot axis. A mechanical brake susceptible to preventing rotation of a road wheel of the trailer and actuated by a degree of mechanical motion applied to a portion thereof is interconnected to the lever by a cable. The cable is affixed to the lever at a location which provides significant mechanical advantage in converting a large degree of manually effected lever movement at minor force to form a small degree of output cable movement at major force. In braking operation, the lever is rotated to provide cable stress which ultimately is proportioned to the amount of braking engagement realized. In release, a release member is manually actuated while maintaining position of the lever followed by releasing the lever to a position which relieves tension in the cable and thereby disengaging the brake.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved trailer brake system which permits a trailer operator to safely apply and maintain brake action.

It is therefore an additional object of the present invention to provide a new and improved trailer brake system which has all the advantages of the prior art trailer brake systems and none of the disadvantages.

It is another object of the present invention to provide a new and improved trailer brake system which may be easily and efficiently manufactured and marketed.

It is a further object of the present invention to provide a new and improved trailer brake system which is of a durable and reliable construction.

An even further object of the present invention is to provide a new and improved trailer brake system which is susceptible of a low cost of manufacture with regard to both materials and labor, and which accordingly is then susceptible of low prices of sale to the consuming public, thereby making such trailer brake systems economically available to the buying public.

Still yet another object of the present invention is to provide a new and improved trailer brake system which provides in the apparatuses and methods of the prior art some of the advantages thereof, while simultaneously overcoming some of the disadvantages normally associated therewith.

Still another object of the present invention is to provide a new and improved trailer brake system having a readily accessible lever stimulated brake engagement system which may be actuated under emergency conditions such as may be encountered during the launch of small watercraft from steeply sloped ramps.

Yet another object of the present invention is to provide a new and improved trailer brake system applicable to various travel and boat trailers and furthermore being readily installable on existing trailers as well as being introducible in new trailer designs and concepts.

Even still another object of the present invention is to provide a new and improved trailer brake system which may be locked using a padlock or other common keyed or combination lock thereby providing security to parked trailers and rendering the trailer less susceptible to theft or vandalism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
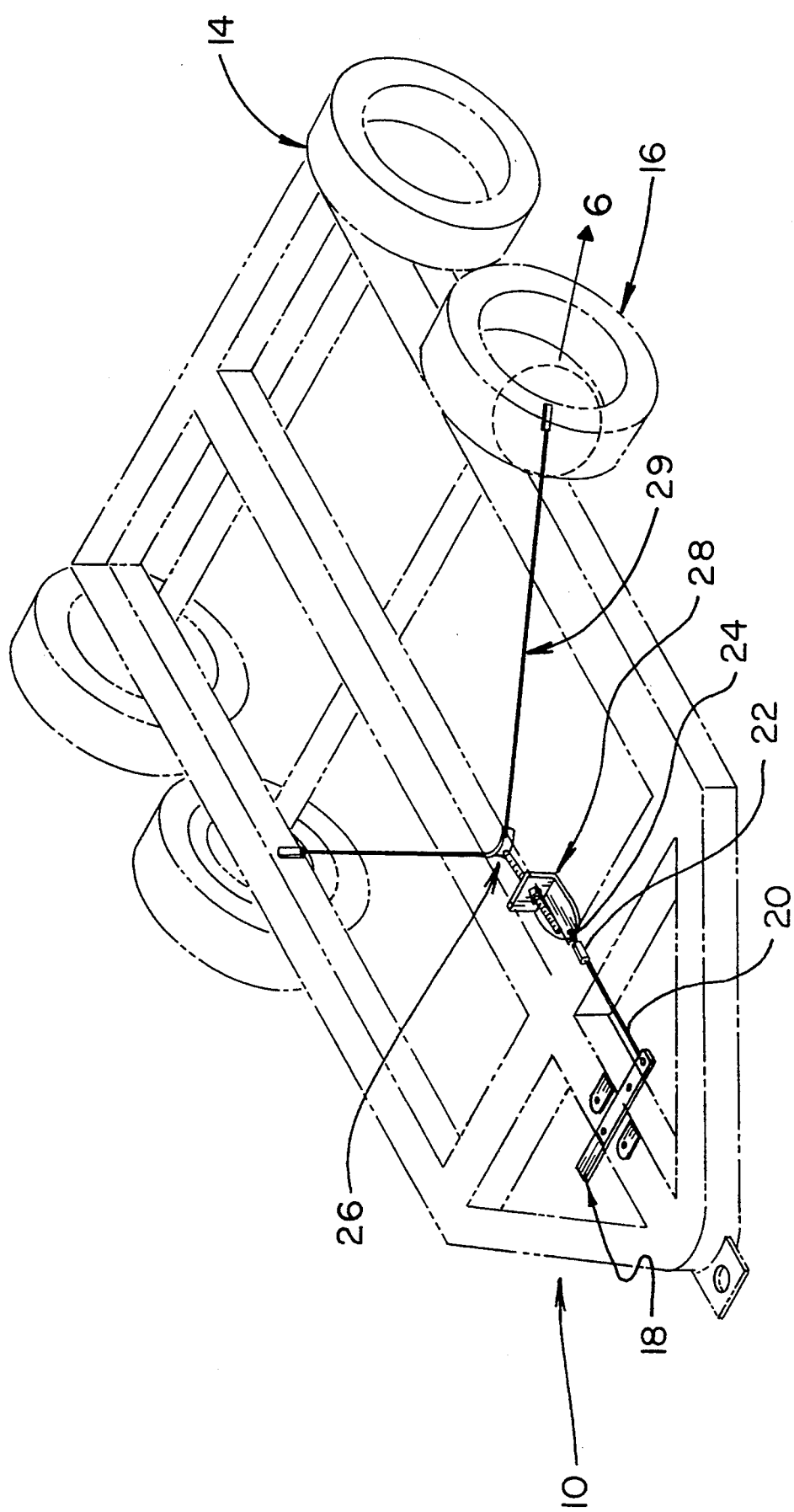
FIG. 1 is a perspective view of the trailer brake system showing the general position of components thereof.

With reference now to the drawings, and in particular to FIG. 1 thereof, a new and improved trailer brake system embodying the principles and concepts of the present invention and generally designated by the reference numeral 10 will be described.

From an overview standpoint, the trailer brake system 10 is adapted for use with a towed trailer 12 having at least one opposingly disposed pair of road wheels 14 wherein one road wheel pair 16 has a mechanical braking means preventing road wheel rotation upon application of a control force. See FIG. 1. The trailer brake system 10 comprises an elongated pivotally attached lever 18, a first cable member 20, a swivel 22, a second cable member 24, a cable splitter equalizer 26, a cable length compensator adjustment 28, and third cable member 29.

Figure 2:
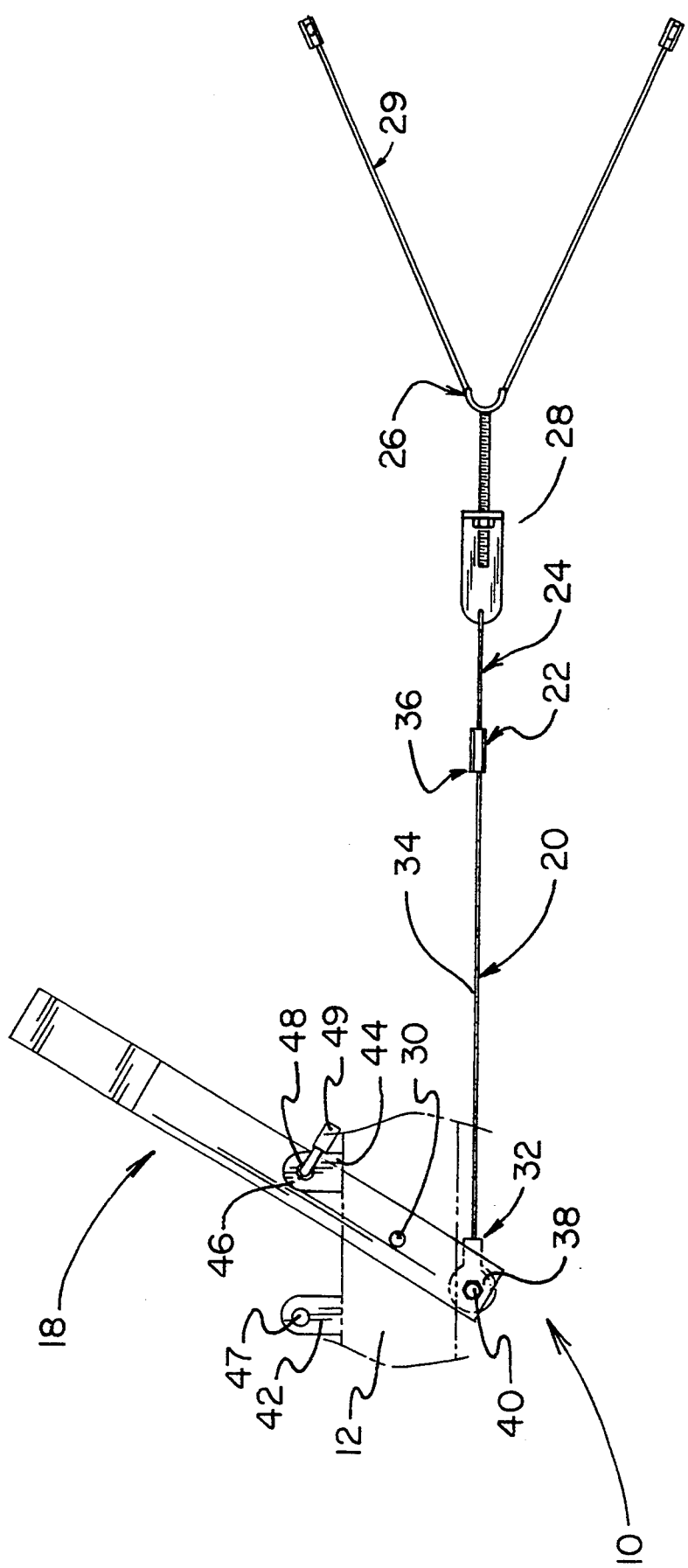
FIG. 2 is a side elevational view of the trailer brake system showing various components thereof.

More specifically, it will be noted that the trailer brake system 10 comprises a series of cables and a cable length adjustment device operated by manually rotating lever 18 wherein lever 18 is pivotally affixed to the frame of trailer 12 by trunnion 30. See FIG. 2. First cable member 20 comprises an elongated wire rope having a first end portion 32, a central portion 34, and a second end portion 36. First end portion 32 comprises a permanently affixed round eye cable termination fitting 38. A bolt member 40 is passed through a central hole in cable termination fitting 38 and threadedly fastened to lever 18 thereby providing a pivotal interconnection of lever 18 and first cable member 20.

Central portion 34 comprises a length of substantially cylindrical multi-stranded wire rope of steel composition and preferably of non-corrosive aircraft quality stainless steel. Second end portion 36 comprises an interface to a portion of swivel 36 such as a ball, cage, or any other abutting members employed therein. Swivel 36 comprises a first freely rotatable member permanently affixed to second end portion 36 of first cable member 20 and a second freely rotatable member permanently affixed to an end of second cable member 24 wherein the first and second freely rotating members are permitted to undergo free rotation about a central axis and furthermore are precluded from any but the smallest relative translation in any direction thereby providing a pivotal action required to permit rotation of second cable member 24 about a longitudinal axis without tending to rotate first cable member 20.

A first tab 42 and second tab 44 are affixed to trailer 12 frame. First tab 42 and second tab 44 have through holes 46 and 47 disposed therein. Through holes 46 and 47 are susceptible to alignment with a third through hole 48 disposed in pivoting lever 18 depending upon the pivotal position of said lever 18. Lock 49 may engage the aligned combination of through holes 46 and 48 thereby maintaining the lever 18 in a locked, brake actuated condition. Or lock 49 may be moved to hole 47 and further be caused to engage hole 48 in lever 18 thereby maintaining a brake de-activated condition as required for movement of trailer 12.

Figure 3:
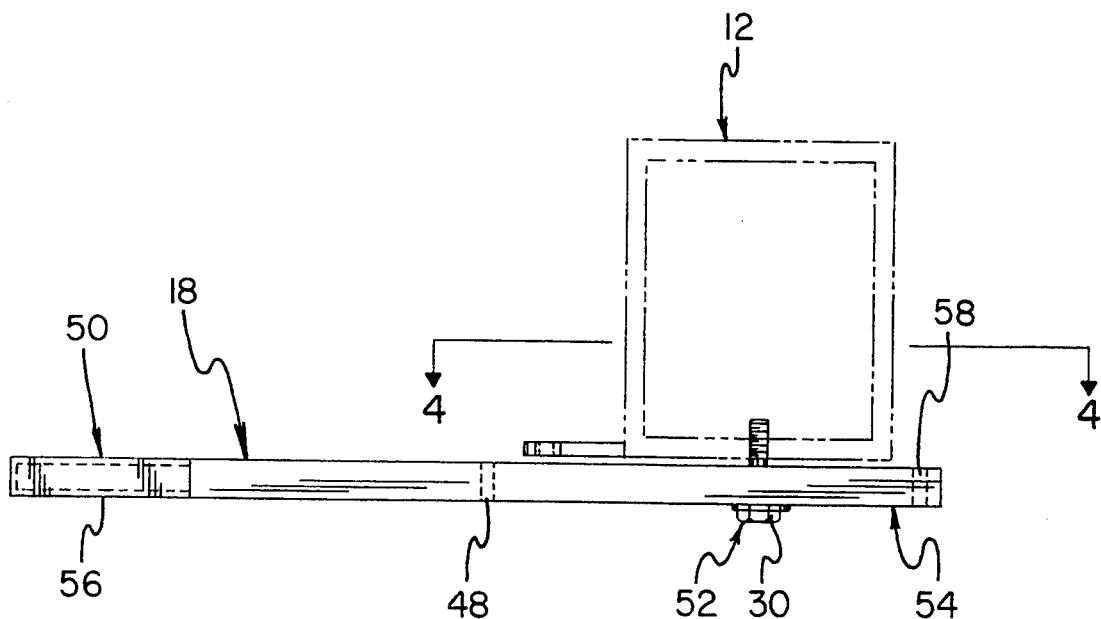
FIG. 3 is side elevational view of the trailer brake system showing the lever member.
Figure 4:
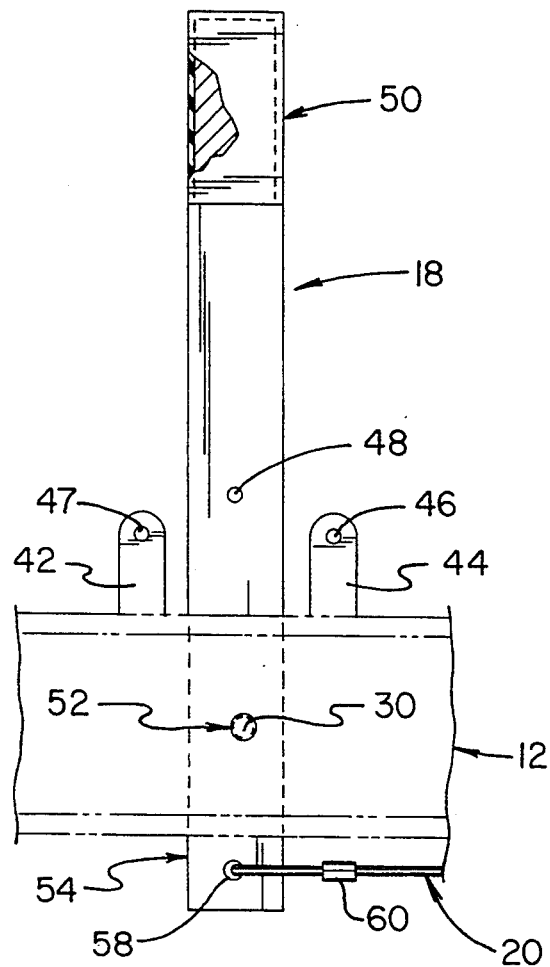
FIG. 4 is a side sectional view of the trailer brake system taken substantially upon the plane indicated by the section line 4—4 of FIG. 3.

Elongated pivotally attached lever 18 comprises a handle portion 50, a fulcrum engagement portion 52, and a cable engagement portion 54 wherein the substrate material is a steel bar preferably of noncorrosive composition. See FIGS. 3 and 4. Handle portion 50 comprises a polymeric covering 56 fastened to the underlying substrate by frictional engagement or adhesives. Fulcrum engagement portion 54 comprises a single through hole engaging trunnion 30. Trunnion 30 comprises a threadedly engaging bolt fastened to trailer 12 frame. Cable engagement portion 54 comprises a through hole 58 wherein a bolt member 40 may be fastened. Or a portion of first cable member 20 may be passed through hole 58 and be affixed upon itself using swage coupler 60.

Cable splitter equalizer 26 comprises a saddlelike member 70 of high strength metallic or equivalent composition having a threaded shaft portion 72 affixed thereto. Saddlelike member 70 comprises a thin elongated plate having a first and second radius of curvature wherein the first radius of curvature is large and the second radius of curvature is small and furthermore the small and large radii of curvature are orthogonally disposed thereby forming a smoothly curving cable engagement channel within which third cable member 29 is disposed. Threaded shaft portion 72 is generally affixed to saddlelike member 70 in a location of non-interference with third cable member 29. Threaded shaft portion 72 additionally engages cable length compensator adjustment 28.

Figure 5:
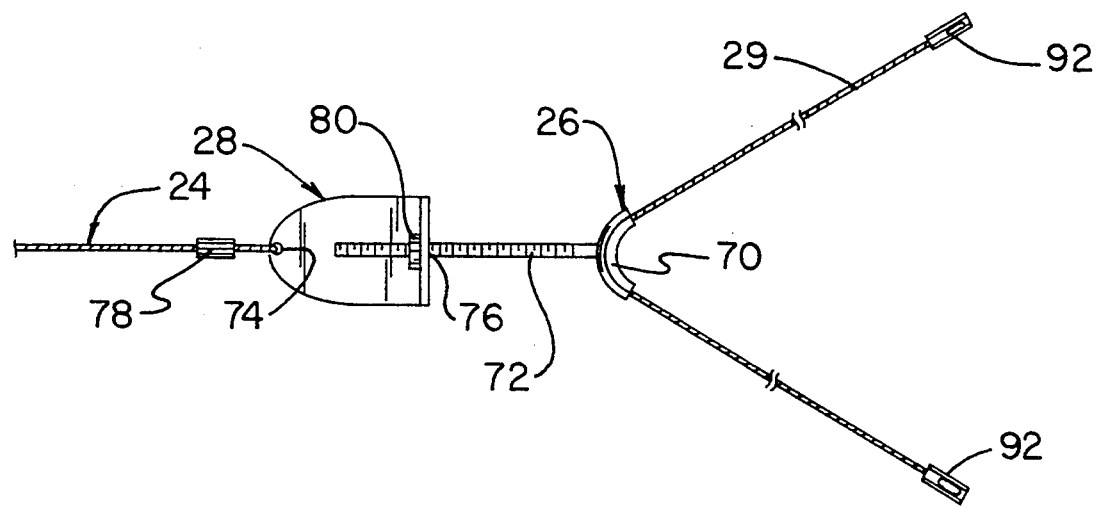
FIG. 5 is a fragmentary side elevational view of a trailer brake system showing a cable adjustment and splitter device.
Figure 6:
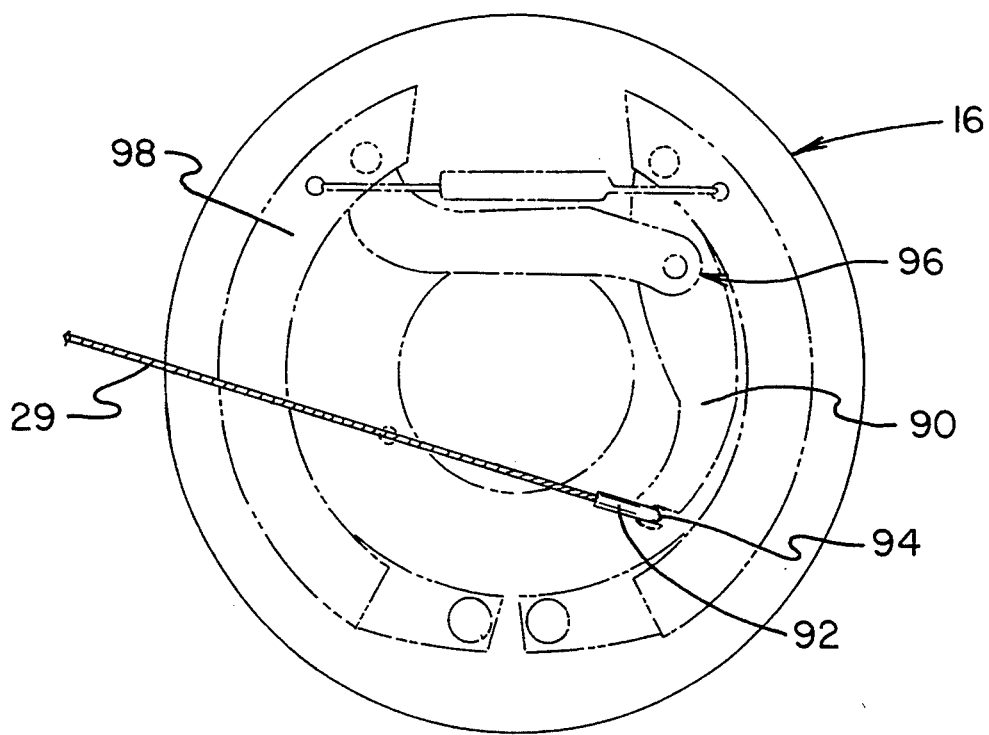
FIG. 6 is a side elevational view of an alternate embodiment of the trailer brake system showing attachment of a cable to a shoe brake mechanism.

Cable length compensator adjustment 28 comprises an L-shaped member having a first through hole 74 and a second through hole 76. See FIG. 5. An end of second cable member 24 is threaded through hole 74 and fastened upon itself using swage fastener 78 thereby permanently attaching second cable member 24 to cable length compensator adjustment 28. Second through hole 76 engages threaded shaft portion 72 and releasable locknut 80 is threadedly fastened thereon to provide adjustment the overall length of the interconnection of lever 18 and brake actuation lever 90. See FIG. 6.

Third cable member 29 comprises an elongated wire rope cable having an eye fitting permanently fastened to both free ends thereof. Eye fitting 92 has an elongated centrally disposed slot which engages an hooklike member 94 disposed at a free end of brake actuation lever 90. Force applied to third cable member 29 by lever 18 and associated cabling and adjustment appears at hooklike member 94 and is thereby applied to brake mechanism 96 which moves brake shoes 98 outward to engage a brake drum.

In an alternate embodiment, a toothed plate is affixed to the trailer frame wherein a pawl member disposed upon lever 18 may engage teeth upon the toothed plate and thereby achieve locking lever 18 at any position. A release button may be provided on handle 18 to release the pawl thereby permitting lever 18 to being susceptible to substantially free rotation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by LETTERS PATENT of the United States is as follows:

1. A new and improved trailer brake system for releasably applying trailer brakes by manual effort comprising:
    a lever pivotally affixed to an existing trailer frame by a trunnion, the lever comprising an elongated metallic bar having a first free end portion, a central portion, and a second free end portion, the first free end portion having a polymeric layer applied thereon, the central portion having a through hole disposed therein, the second free end portion having a through hole disposed therein forming a pivotal bearing and furthermore positioned more proximate the second free end portion than the first free end portion;
    a releasable position retention means comprising a pair of tab members permanently affixed to a frame portion of the trailer wherein each tab member is disposed on either side of the lever and has a through hole susceptible to loose engagement with one or more existing locks disposed therein with the lever having a similar through hole susceptible to alignment with every through hole of the tab members for maintaining a condition of locking using an existing lock in either a brake engaged or brake disengaged mode;
    a force transmission means comprising a first cable member having a cable fastening means affixed to free ends thereof, the cable fastening means comprising an eye type cable fitting installed upon at least one of said cable free ends pivotally affixable to the lever and having a swivel first end member affixed to said second free end thereof, the force transmission means having a second member having a cable fastening means affixed to free ends thereof, a swivel joining the first and second cable members wherein the swivel permits multiple rotation of the first and second cable members;
    a cable length compensation device comprising an L-shaped member having a first through hole and a second through hole, an end of the second cable member threadably secured to the first through hole; and
    a cable splitter equalizer comprising a saddle-like member having a threaded shaft portion affixed thereto, the saddle-like member comprising a thin elongated plate having a first and second radius of curvature wherein the first radius of curvature is large and the second radius of curvature is small thereby forming a smoothly curving cable engagement channel within which a third cable member being disposed, the threaded shaft portion engaging the second through hole of the cable length compensation device, the third cable member having an eye fitting permanently fastened to both free ends thereof, the eye-fittings engage a hook-like member disposed at a free end of a brake actuation lever, force applied to the third cable member by the lever at hook-like member thereby applies a brake mechanism which moves brake shoes outward to engage a brake drum.

* * * * *